(12) United States Patent
Sobol

(10) Patent No.: US 6,807,299 B2
(45) Date of Patent: *Oct. 19, 2004

(54) METHOD FOR CONTRAST MAPPING OF DIGITAL IMAGES THAT CONVERGES ON A SOLUTION

(75) Inventor: Robert E. Sobol, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 676 days.

This patent is subject to a terminal disclaimer.

(21) Appl. No.: 09/803,293

(22) Filed: Mar. 10, 2001

(65) Prior Publication Data

US 2002/0154832 A1 Oct. 24, 2002

(51) Int. Cl.⁷ ................................. G06K 9/00
(52) U.S. Cl. ..................... 382/166; 382/167; 382/274; 358/1.9; 358/518
(58) Field of Search ................................. 382/166, 167, 382/168–169, 254, 265–270, 274, 260, 263, 264, 130, 132, 302; 358/1.9, 3.26, 516, 518–522, 445, 447; 348/671, 673, 678

(56) References Cited

U.S. PATENT DOCUMENTS

| | | | | | |
|---|---|---|---|---|---|
| 4,384,336 A | * | 5/1983 | Frankle et al. | ............... | 382/302 |
| 5,450,502 A | * | 9/1995 | Eschbach et al. | ........... | 382/169 |
| 5,774,599 A | * | 6/1998 | Muka et al. | ................ | 382/254 |
| 6,069,979 A | * | 5/2000 | VanMetter | ................... | 382/260 |

OTHER PUBLICATIONS

Rahman et al., Multi–scale retinex for color image enhancement, IEEE 0–7803–3258, 1003–1005.*

* cited by examiner

Primary Examiner—Leo Boudreau
Assistant Examiner—Ishrat Sherali
(74) Attorney, Agent, or Firm—Steven L. Webb

(57) ABSTRACT

A method of local contrast mapping that changes the dynamic range of an original image to more closely match the dynamic range of the medium used for the reproduction. The method variably compresses large contrast differences between different areas of an image while variably modifing small contrast differences between different areas of an image.

7 Claims, 9 Drawing Sheets

(4 of 9 Drawing Sheet(s) Filed in Color)

METHOD FOR CONTRAST MAPPING OF DIGITAL IMAGES THAT CONVERGES ON A SOLUTION

RELATED APPLICATIONS

The application "A method for variable contrast mapping of digital images" that has the H.P. docket number 10005185 is related to this application. The application "A method for improved contrast mapping of digital images using a variable mask" that has the H.P. docket number 10003259 is also related to this application. Both the above referenced applications were filed on the same day as this application. The application "A method for improved contrast mapping of digital images" that has the Ser. No. 09/491946 and was filed on Jan. 26, 2000 is related to this application and is hereby incorporated by reference.

FIELD OF THE INVENTION

The present invention relates generally to digital image enhancement and more specifically to a method of local contrast mapping that changes the dynamic range of an original image to more closely match the dynamic range of the medium used for the reproduction.

BACKGROUND OF THE INVENTION

When taking photographs of an outdoor scene, the brightness ratio, or dynamic range, of an area in full sunlight to another area in deep shade can exceed 1000:1. When a reflective print is created of this scene the print is typically limited to a dynamic range less than 100:1. Because of the large mismatch between the dynamic range of the reflective print and the original scene, there needs to be some mapping or transformation of the dynamic range of the scene onto the available dynamic range of the reflective print to create a pleasing reproduction.

A common technique used to map one dynamic range onto another dynamic range is the use of a nonlinear curve, often implemented digitally with a tone map. Tone maps are lookup tables that transform numbers from an input range (1000:1 in an outdoor scene) to a new range (100:1 for a reflective print). Tone maps are typically applied globally; all points in an image that have a certain numerical value are mapped to precisely the same output value. Unfortunately when using a tone map to map a large dynamic range onto a much smaller dynamic range the resulting image often produces a sensation of reduced contrast. This reduction in contrast makes the image appear flat and unappealing.

Photographers have addressed this problem by darkroom manipulations called burning and dodging. Dodging is a technique, performed while printing a negative onto photographic paper, in which dark areas of the image are lightened by casting a shadow over the area for some portion of the total exposure time. The shadow reduces the amount of light exposure to the print thereby lightening that part of the image. The shadow is commonly produced by blocking light projected by the enlarger lens with a piece of cardboard on a piece of wire, or even with the photographer's hand. Burning is the opposite process in which additional exposure time is given to the photographic paper by increasing the amount of light exposure to some area of the print. Typically a card with a small hole is held over the print with the light falling through the hole exposing only the area of the image to be darkened.

Dodging and burning work well for large areas of slowly changing brightness, but produce halos in areas that have complex shapes.

Another technique used to reduce the dynamic range in a scene is the Retinex algorithm developed by John McCann of Polaroid. Retinex is based on the Retina and Cortex theory of human vision developed by Edward Land. The basic Retinex algorithm is described in U.S. Pat. No. 4,384,336 "Method and Apparatus for lightness imaging" which is hereby incorporated by reference. The Retinex algorithm reduces the dynamic range of an image by removing much of the slowly varying changes in illumination in the scene. For images that have slowly changing illumination the original Retinex algorithm can make significant improvements in the appearance of the mapped reflective print. For images that have areas with rapidly changing levels of illumination, or even abrupt boundaries between different sources of illumination, the original Retinex algorithm may only produce subtle improvements.

What is needed is a method that reduces the large brightness ratios, or large contrasts, and at the same time preserves, the small, local brightness ratios in the image. This is important to preserve the sensation of contrast when viewing the image. Therefore there is a need for a system that can compresses large contrast differences between different areas of an image while preserving small contrast differences between different areas of an image.

SUMMARY OF THE INVENTION

A method of local contrast mapping that changes the dynamic range of an original image to more closely match the dynamic range of the medium used for the reproduction. The method modifies the contrast differences between different areas of the original image as a function of the distance between the different areas.

Other aspects and advantages of the present invention will become apparent from the following detailed description, taken in conjunction with the accompanying drawings, illustrating by way of example the principles of the invention.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 9 is a flowchart of an exemplary operation for changing the dynamic range of an original input image to

DETAILED DESCRIPTION OF THE PREFERRED EMBODIMENT

Figure 1:
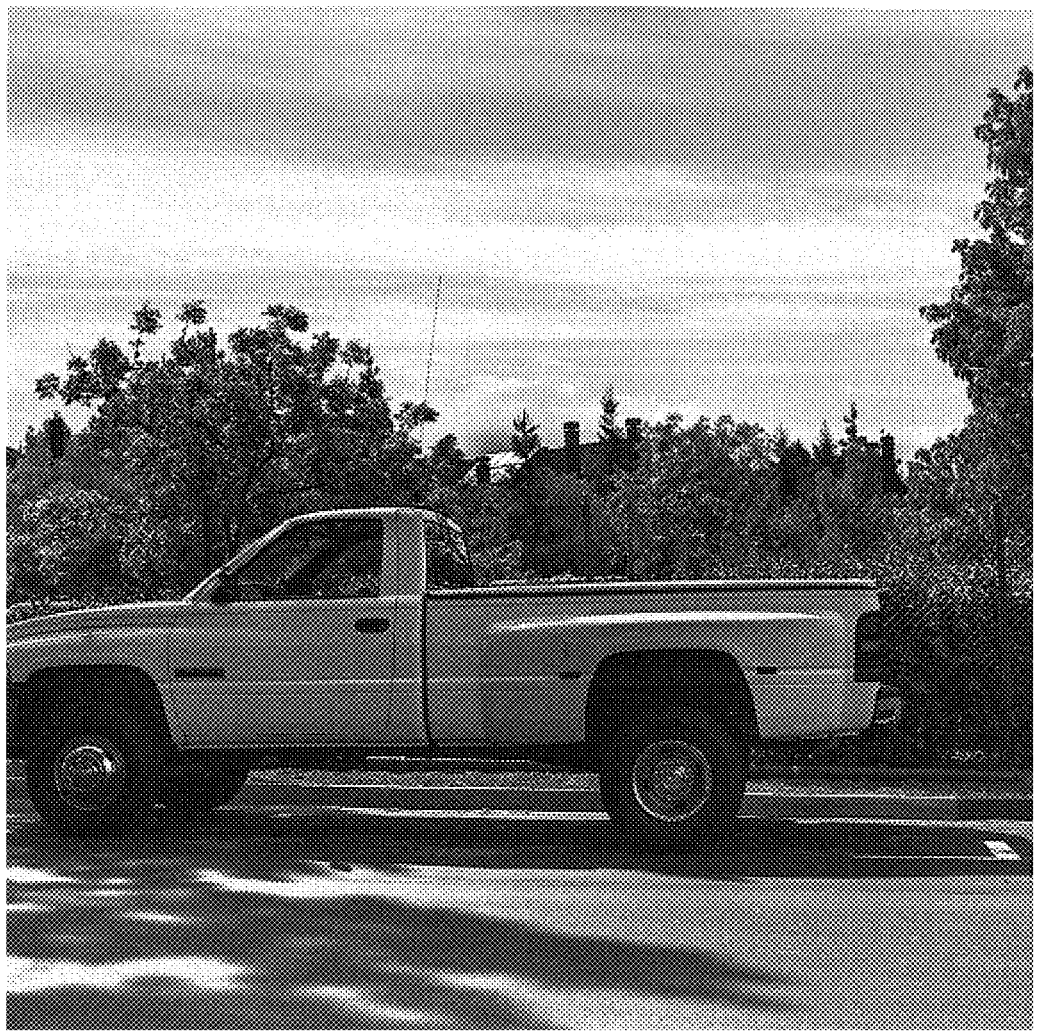
FIG. 1 is a print of an image that has a very bright object adjacent to a large uniform area.

A method of compressing large contrast differences between different areas of an image while preserving small contrast differences between different areas of an image can vastly improve the appearance of the reproduction of an image that has a large range of illumination intensity. Algorithms that locally darken or lighten an image by computing contrast differences between various portions of a scene can be significantly improved by maintaining the small contrast differences and compressing the large contrast differences. One such algorithm that can be approved is the original Retinex algorithm.

In the original Retinex algorithm an output image O is iteratively formed from an input image according to the following relationship:

$$O'_{x,y} = \frac{ClipToWhite(I_{x,y} - I_{xs,ys} + O_{xs,ys}) + O_{x,y}}{2} \quad \text{Equation 1}$$

Where $I_{x,y}$ refers to a segmental area of the input image at location x, y. $I_{xs,ys}$ refers to a segmental area in a shifted version of the input image where the image has been displaced by some distance dx and dy relative to the original image. Both images I and O are logarithmically encoded according to a measure of brightness (or are in log space) so taking a difference is the same as computing a ratio. For example the term $I_{x,y}-I_{xs,ys}$ in equation 1 is the ratio of the intensity (or radiance) at one location in the input image with respect to the intensity (or radiance) of the image at a different location in the input image. In log space adding a term is the same as multiplying. For example adding the term $O_{xs,ys}$ in equation 1 is equivalent to taking the product of the ratio of the input intensities ($I_{x,y}-I_{xs,ys}$) with the intensity of the displaced output image ($O_{xs,ys}$). The ClipToWhite function constrains the result of the product of the ratio to remain within the maximum intensity values. For example when the range of input intensity (or radiance) values are between 0 and 255, the ClipToWhite function would reduce any value over 255 to 255. In equation 1 the product of the ratio does not go below zero and therefore the ClipToWhite function never needs to increase a value from less than zero up to zero (a ClipToBlack function). When the result of the product of the ratio ($I_{x,y}-I_{xs,ys}+O_{xs,ys}$) is 270 the ClipToWhite function would reset the value to 255. In the original Retinex algorithm, the input images and output image are shifted relative to each other starting with large displacements. A typical initial shift would be a power of two that is about one half the width or height of the input image. The image displacements proceed in a circular pattern for several revolutions or iterations. Then, the displacements are halved and the processes is repeated, until the displacement reaches zero (See U.S. Pat. No. 4,384,336). One of the problems with equation 1 was that it asymptotically approached the input image. Therefore determining the number of revolutions or iterations to produce the desired effect in the image was difficult. When too few revolutions or iterations were performed the maximum effect was not reached, when too many revolutions or iterations were performed the image approached the input image.

The ratio of the intensity (or radiance) of the image at two different locations ($I_{x,y}-I_{xs,ys}$) is a measure of the relative contrast difference (or contrast ratio) of one part of the image compared to another part of an image.

The current invention compresses the large intensity ratios and preserves the small intensity ratios. To compress the large ratios and preserve the small ratios a tone map or look up table (LUT) can be used. The LUT is used to modify the ratio of intensity differences between different areas of the input image (see equation 2).

$$O'_{x,y} = \frac{ClipToWhite(LUT(I_{x,y} - I_{xs,ys}) + O_{xs,ys}) + O_{x,y}}{2} \quad \text{Equation 2}$$

Additional improvements can be made to the Retinex-like formula (see equation 3).

$$O'_{x,y} = O_{x,y} + \frac{ClipToBlackandWhite(LUT(I_{x,y} - I_{xs,ys}) + (O_{x,y} - O_{xs,ys}))}{2} \quad \text{Equation 3}$$

Using equation 3 a new output image $O'_{x,y}$ is created from the original output image $O_{x,y}$ by adding a hard limited difference between the density ratios that are desired, LUT ($I_{x,y}-I_{xs,ys}$), and the current density ratios in the output image $O_{x,y}-O_{xs,ys}$. Because the hard limited difference between the density ratios that are desired, LUT($I_{x,y}-I_{xs,ys}$), and the current density ratios in the output image $O_{x,y}-O_{xs,ys}$ can go less than zero, a clip to black and white function is used. This clip to black and white function raises any values below zero up to zero, and lowers any values above max white, down to maximum white.

The result of equation 3 is that the output ratios converge on a set of desired ratios during iteration. Because of the LUT equation 3 converges on an image that is not equal to the input image. Because equation 3 convergence towards a desired ratio the number of iterations at each distance or displacement is less critical than equation 1. In the preferred embodiment 4 iterations or rotations are used. Each rotation or iteration consists of 4 "hops". Each hop being a displacement in one direction from the starting position, for example the displacements would proceed in a circular pattern going east, south, west, and then north from the starting position. The LUT also allows the original output image to be initialized to anything, including the original input image (typically the output image is initialized to light grey). This was not possible with equation 1. When Equation 1 is initialized to the original input image, the new output image is the same as the input image.

By changing the initialization of the original output image different effects can be achieved. Some of the things the original output image can be initialized to are: white, black, a shade of grey, a color, or the input image. Typically when the original output image is initialized to white, the iterated output image is lighter than when the original output image is initialized to grey or black. One of the advantages of equation 3 is that it produces less visible halos around very bright objects when the output image is initialized to the input image.

Figure 2:
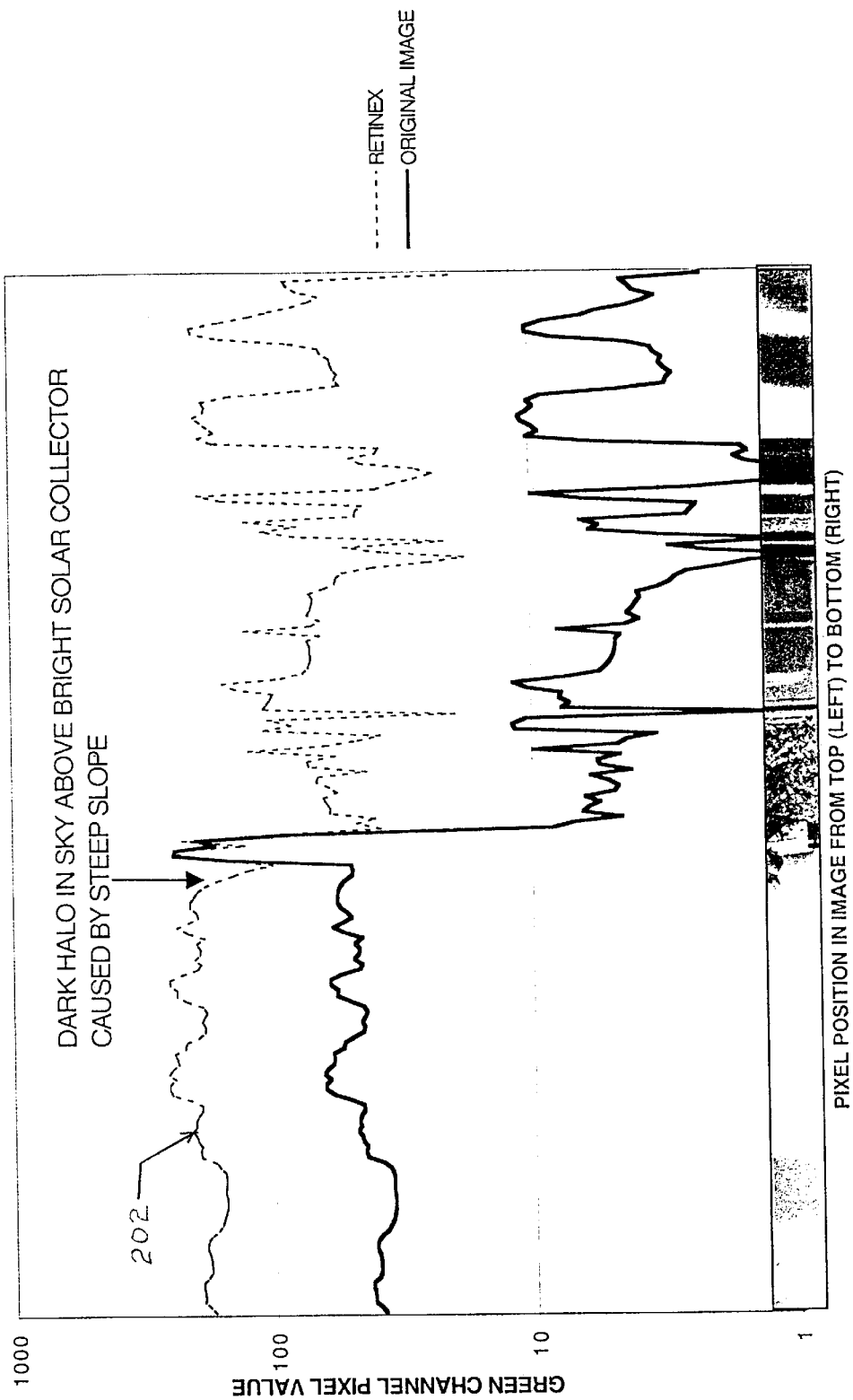
FIG. 2 is a plot of the log intensity values in a marrow region from FIG. 1.
Figure 3:
FIG. 3 is a print of the image of FIG. 1 after modification with a method using equation 3 according to the present invention.
Figure 4:
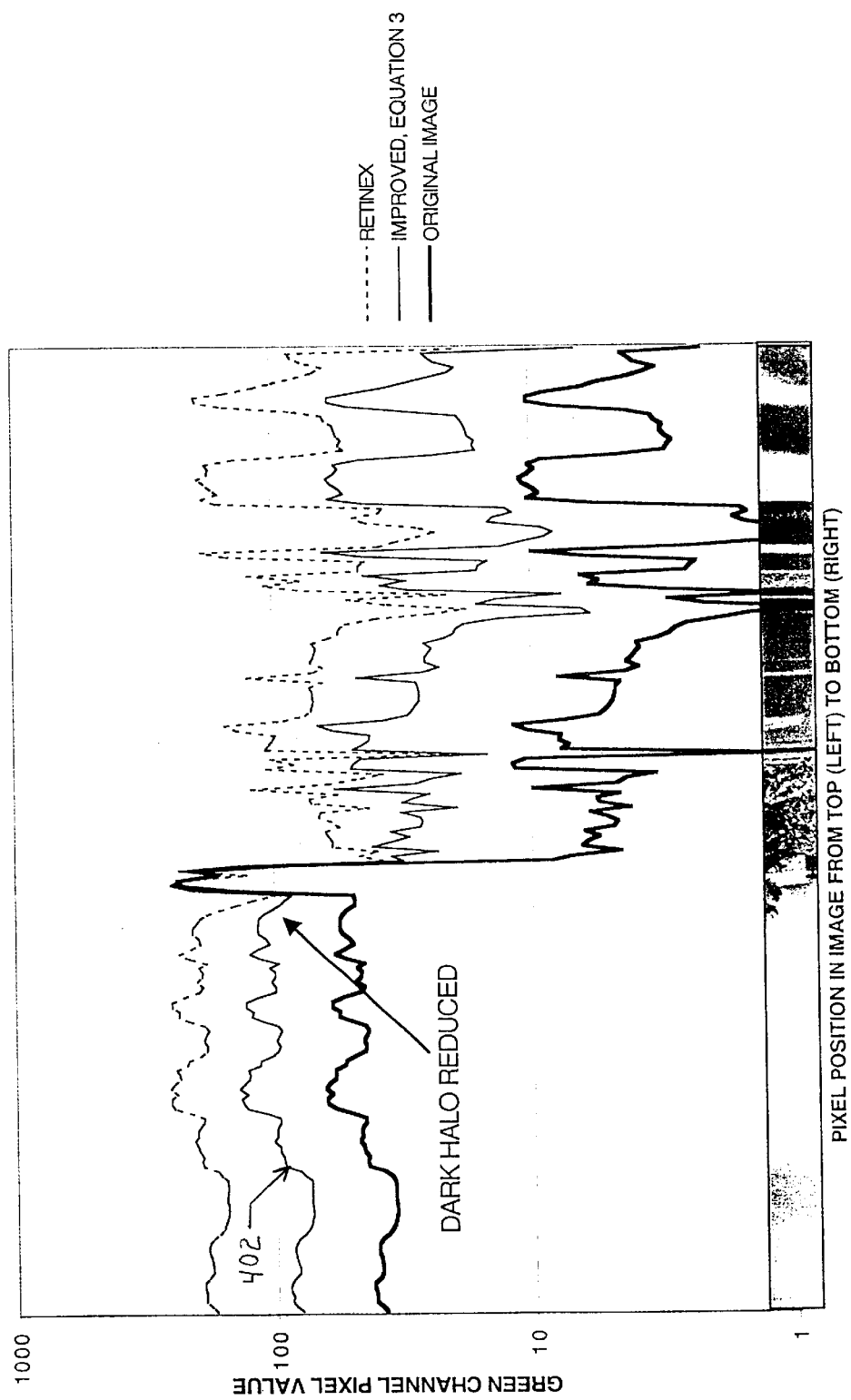
FIG. 4 is a plot of the log intensity values in a marrow region from FIG. 3.

For example, FIG. 1 is an image that contains a very bright object, the solar collectors, adjacent to a large uniform area, the sky. FIG. 1 has been modified by the method using equation 2. As can be seen, a halo has formed around the area of the bright object. FIG. 2 shows an analysis of an area containing the bright object in the image from FIG. 1 before and after the processing by the method using equation 2. The analysis shows the processing incorrectly brightened the sky (see 202) producing an unnatural edge between the sky and the solar collector. The edge appears as the abrupt dip in the line 202 in the output plot creating a halo. FIG. 3 shows the same image modified with a method using equation 3 with the original output image initialized to the input image and then gain adjusted. When the output image is initialized to the input image using equation 3, the resulting image typically needs to be brightened somewhat with a gain adjustment. FIG. 4 is a plot of the analysis of FIG. 3. The sky in FIG. 3 (line 402) no longer brightens up to the same artificial maximum value as the solar collector; it is now 4 times darker, and the halo in the image has been reduced.

The LUT or tone map in equation 2 and in equation 3 consists of two parts. A line slope of 1:1 passing approximately through the origin is used to preserve the small differences. A hard limit is used to compress the large contrast differences. The hard limit is set to limit the maximum ratio of illumination for example a hard limit of 4-to-1 (or 0.6:1 in log space) may be used. By compressing the large contrast differences while preserving the small contrast differences the overall sensation of contrast can be maintained while the overall dynamic range of the scene has been compressed. These results are impossible to recreate in a darkroom without leaving some halo around areas in an image that has large contrast differences with complex shapes.

The slope of the line passing approximately through the origin in the tone map or LUT can be increased or decreased to adjust the sensation of local contrast without strongly affecting the compression of the large contrast differences of the image. For example, a slope approximately through the origin of about 0.85 can improve harsh lighting from an electronic flash in an image of a person.

Adjusting the hard limit of the ratio of intensities primarily controls the amount by which the darkest areas in an image are brightened. A higher limit (such as a density ratio of 1.5) reduces the amount of brightening and compression. A lower limit (such as a density ratio of 0.4) increases the amount of brightening and compression. The shape of the curve in the tone map can also be changed. For example the sharp change from the line passing through the origin to the hard clip limit can be modified to create a smoothly changing function.

In one embodiment the same tone map or lookup table is used for every x, y displacement. In other embodiments the lookup table can be a function of the x, y displacement.

In one embodiment the slope of the LUT is smaller, at large x, y displacements and the slope is larger for small x, y displacements. One example is when the slope is 1 for large x, y displacements and the slope is greater than 1 for small x, y displacements. This embodiment would act like a sharpening filter. A small x, y displacement is approximately one to four pixels, however larger displacements can be used.

Figure 5:
FIG. 5 is a print of an image where the LUT was the same for each distance between different areas in the image.
Figure 6:
FIG. 6 is a print of an image where the LUT was different for some distances between different areas in the image according to the present invention.

When the slope of the LUT is greater than 1 for medium to large x, y displacements and the slope of the LUT is reduced to 1 or less than 1 for small x, y displacements, the image is sharpened without an increase in the apparent noise. By reducing the slope for small x, y displacements while maintaining the slope for larger x, y displacements the overall level of contrast can be maintained while controlling the noise between closely related pixels. When the slope of the LUT is less than 1 for small x, y displacements the noise is reduced and when the slope of the LUT is 1 for small x, y displacements the noise is controlled. For example FIG. 5 is a print of an image that has been modified using a hard limit of +/−0.5 density ratio and a contrast enhancing slope of 1.8. The overall sensation of contrast has been increased but so has the noise (see FIG. 5). FIG. 6 is the same image as in FIG. 5, modified using the same +/−0.5 density hard limit, but a slope of 1.0 was used instead of the contrast enhancing slope of 1.8 for small x, y displacements of one and two pixels. The overall sensation of contrast was preserved but the noise is much less prominent (see FIG. 6).

Figure 7:
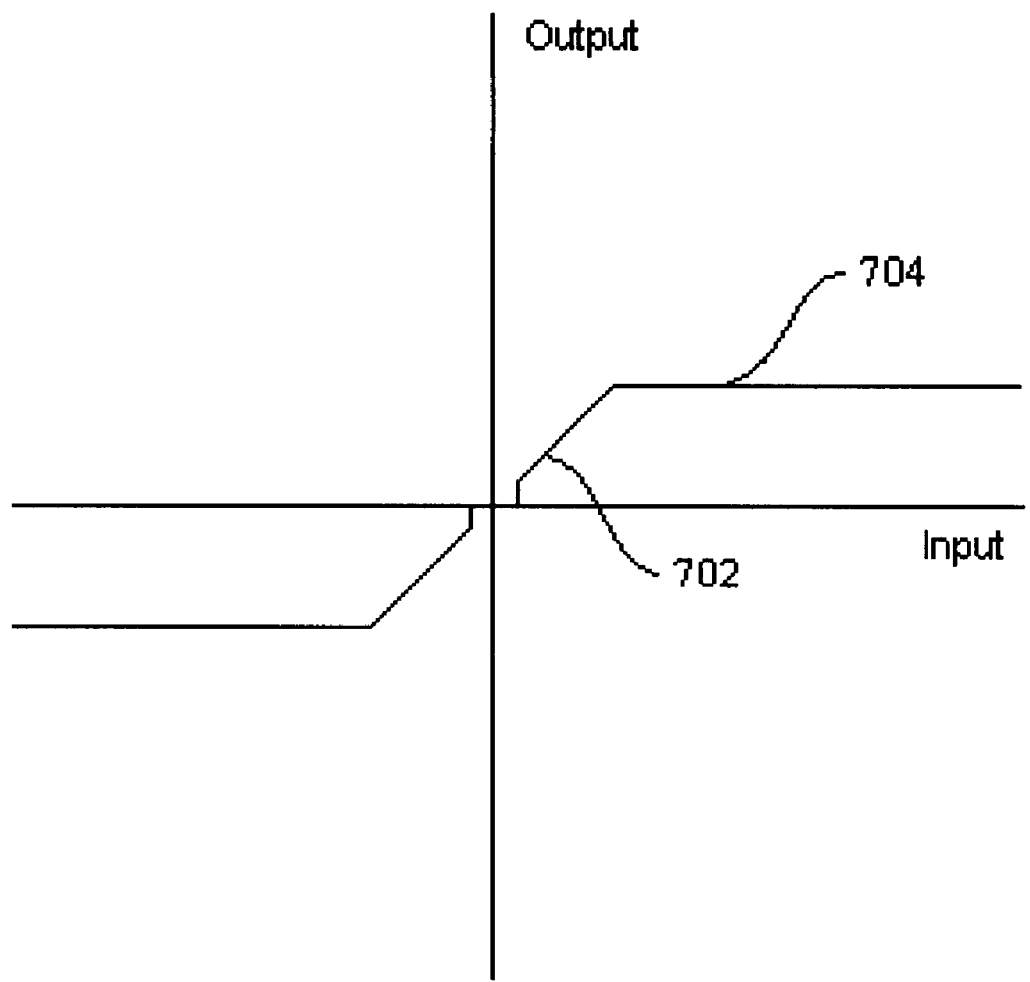
FIG. 7 is a plot of a tone map with a dead band at the origin in accordance with the present invention.

A further reduction in noise can be made by using a small "dead band" at the origin of the LUT for very small x, y displacements (see FIG. 7). The "dead band" eliminates small contrast differences between pixels that are very close together. The dead band would be used for x, y displacements of one to two pixels. For best results the size of the "dead band" would be matched to the noise floor of the image. For example, when an image has a noise floor of one eight bit count, the "dead band" would map any value within $1/255^{th}$ of the origin to zero.

The hard limit used to compress the large contrast differences in the image can also change as a function of the x, y displacements. For example, a low limit (such as a density ratio of 0.4) may be used for large x, y displacements, and a higher limit may be used for medium to small x, y displacements. A large x, y displacement would be approximately $1/8$ of the image or more.

In another embodiment the LUT would be different for each different x, y displacement.

Once an output image has been iteratively formed, a contrast mask can be created by subtracting the logarithmic representation of the output image from the logarithmic representation of the input image. By applying a scalar multiplier to the mask the strength of the contrast mapping can be changed without iteratively recalculating new output images (see FIG. 8). The mask M is created by subtracting the input image (in log space) from the output image (also in log space).

$$M_{x,y}=O_{x,y}-I_{x,y}$$

A scalar multiplier k is applied to the mask, where k is between zero and 1.

$$M'_{x,y}=kM_{x,y}=k(O_{x,y}-I_{x,y})$$

A new output image is formed, where the new output image can range between the original output image and the input image.

$$O'_{x,y}=I_{x,y}+k(O_{x,y}-I_{x,y})$$

Figure 8:
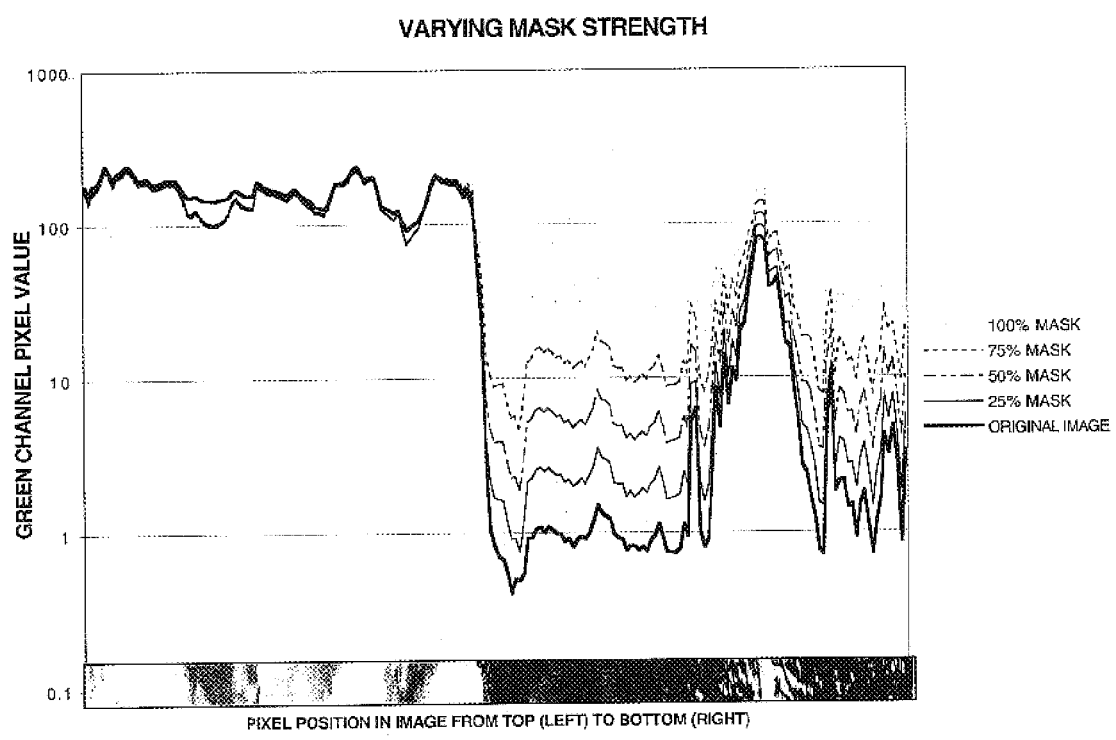
FIG. 8 is a plot of the log intensity values of an image with different scalar multipliers in accordance with the present invention.
Figure 9:
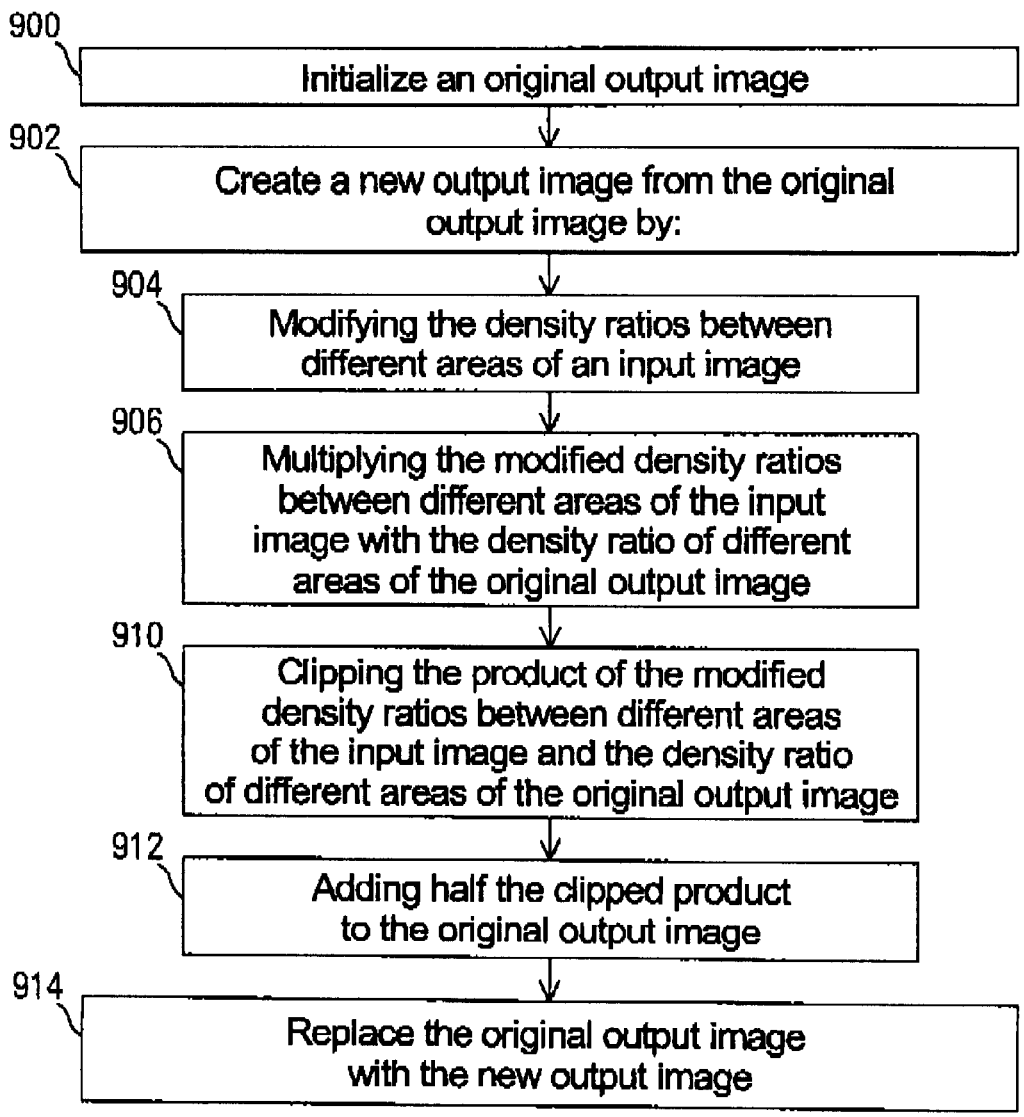

By adjusting the scalar multiplier the amount of gradients in the lighting of an image can be controlled without iteratively recalculating a new output image O (see FIG. 8). The spacing between a number of scalar multiplier used to create a range of images does not need to be linear, it can be logarithmic, a power function, or could be based on histogram information from the image.

Forming the output image O iteratively from the shifted input image at the full resolution of the input and output images, is a computationally intensive process. U.S. Pat. No. 4,750,211 "Method and Apparatus for Image Processing With Field Portions", hereby included by reference, discloses a method of processing images at reduced resolution. U.S. Pat. No. 4,384,336 "Method and Apparatus for lightness imaging" (already incorporated by reference) also describes methods of processing images at reduced resolutions. Combining the methods disclosed in these patents with the current invention can reduce the number of calculations required to produce an improved output image.

The foregoing description of the present invention has been presented for purposes of illustration and description. It is not intended to be exhaustive or to limit the invention to the precise form disclosed, and other modifications and variations may be possible in light of the above teachings. For example a lookup table is one way to implement a tone map. Other method can be used, for example an equation. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of changing the dynamic range of an original input image to more closely match the dynamic range of the medium used for a reproduction, comprising:
   (a) initializing an original output image;
   (b) creating a new output image from the original output image by:
      (1) modifying the density ratios between different areas of an input image;
      (2) multiplying the modified density ratios between different areas of the input image with the density ratio of different areas of the original output image;
      (3) clipping the product of the modified density ratios between different areas of the input image and the density ratio of different areas of the original output image;
      (4) adding half the clipped product to the original output image
   (c) replacing the original output image with the new output image.

2. The method of claim 1 where the original output image is initialized to white.

3. The method of claim 1 where the original output image is initialized to black.

4. The method of claim 1 where the original output image is initialized to the input image.

5. The method of claim 1 where the original output image is initialized to grey.

6. A method of changing the dynamic range of an original input image to more closely match the dynamic range of the medium used for a reproduction, comprising:
   (a) initializing an original output image;
   (b) iteratively creating a new output image from the original output image by repeating steps 1 through 4 at least once for each shifted distance between the original input image and the original output image;
      (1) modifying the density ratios between different areas of an input image;
      (2) multiplying the modified density ratios between different areas of the input image with the density ratio of different areas of the original output image;
      (3) clipping the product of the modified density ratios between different areas of the input image and the density ratio of different areas of the original output image;
      (4) adding half the clipped product to the original output image
   (c) replacing the original output image with the new output image.

7. The method of claim 6 where the number of iterations is limited to 4.

* * * * *